W. W. CARDER.
CORD HOLDER.
APPLICATION FILED JULY 26, 1910.
991,698.
Patented May 9, 1911.
3 SHEETS—SHEET 3.
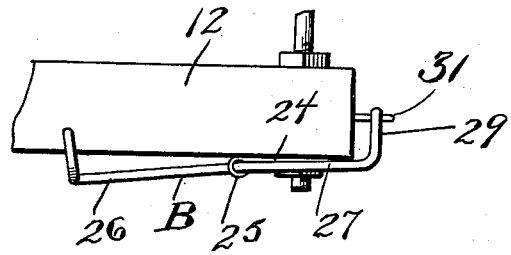
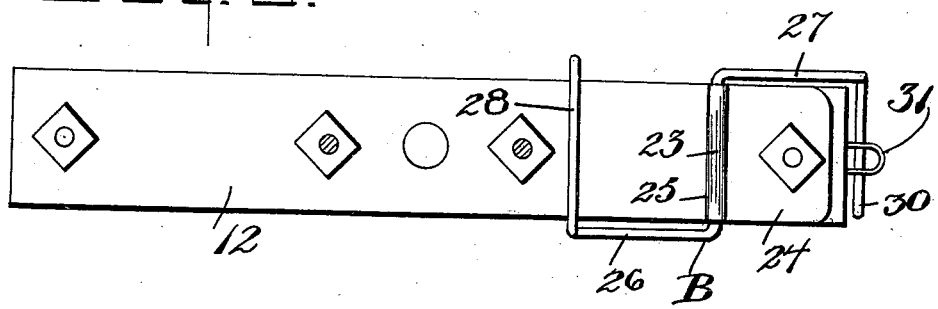
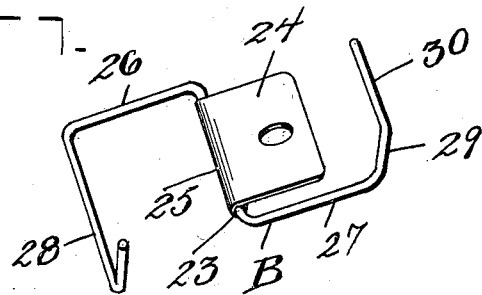
Witnesses
E. E. Johansen
M. L. Lowy.
Inventor
William W. Carder.
By Woodward & Chandler.
Attorneys

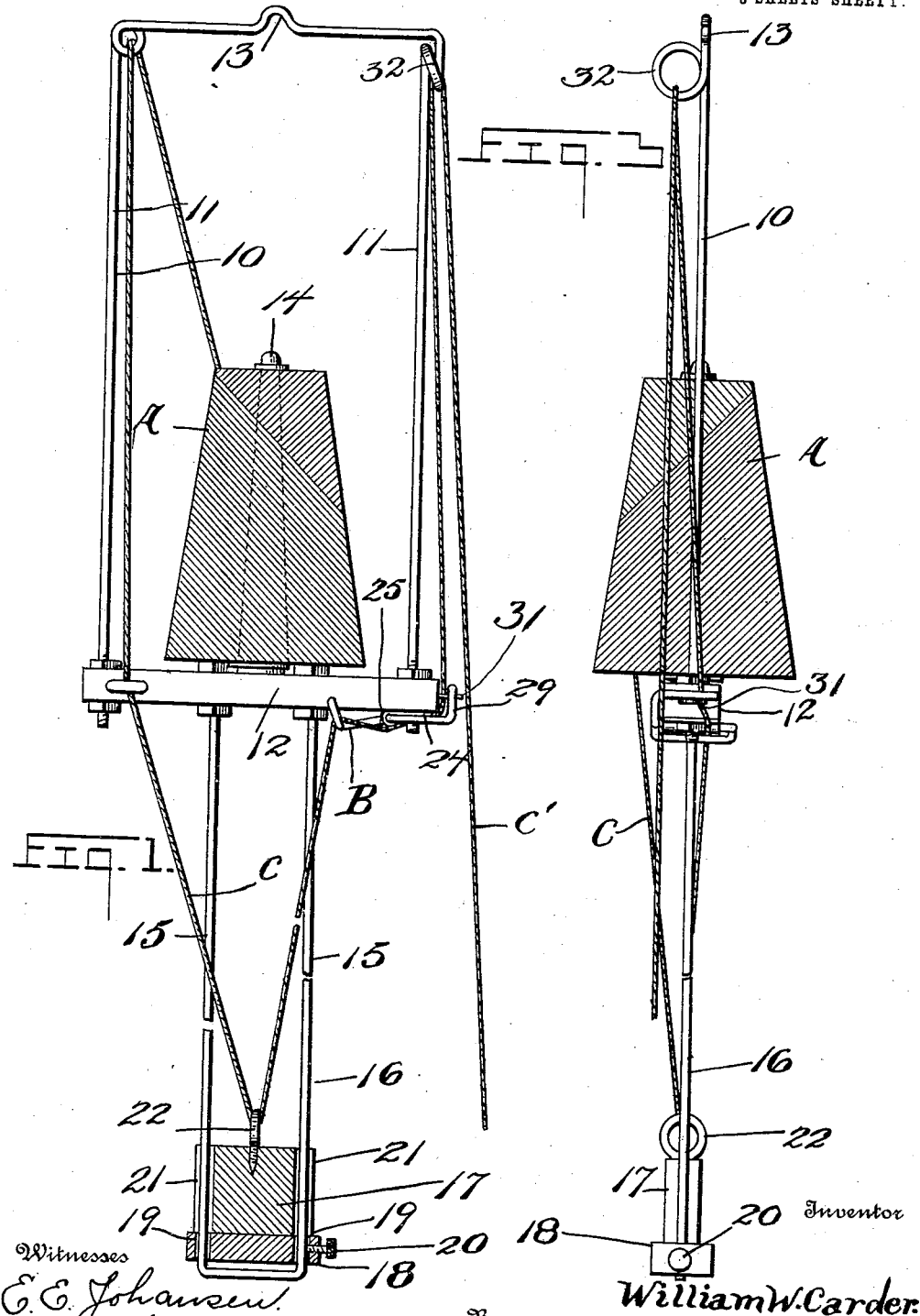

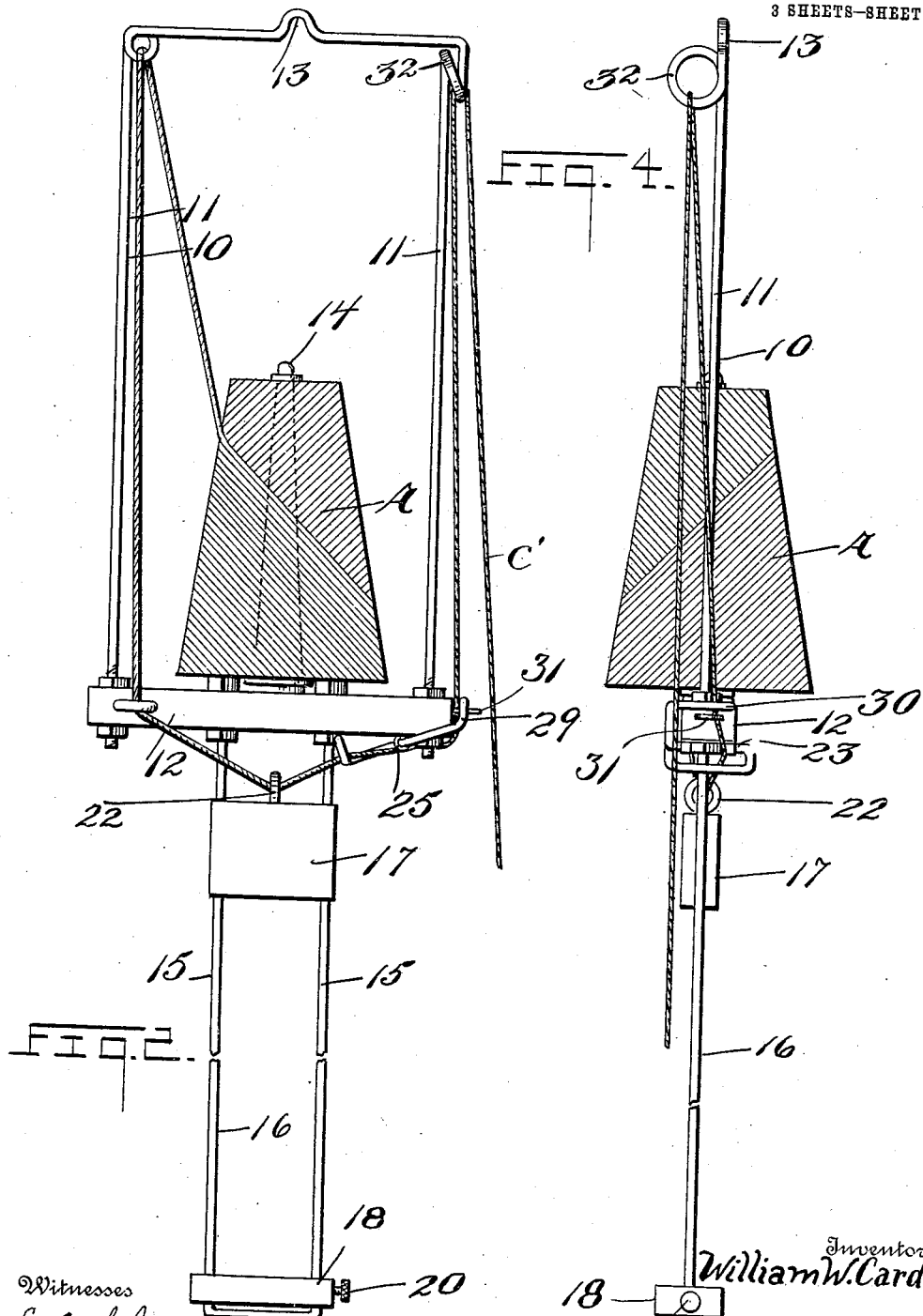

UNITED STATES PATENT OFFICE.

WILLIAM W. CARDER, OF GREEN SPRING, WEST VIRGINIA.

CORD-HOLDER.

991,698.     Specification of Letters Patent.     Patented May 9, 1911.

Application filed July 26, 1910. Serial No. 573,840.

*To all whom it may concern:*

Be it known that I, WILLIAM W. CARDER, a citizen of the United States, residing at Green Spring, in the county of Hampshire and State of West Virginia, have invented certain new and useful Improvements in Cord-Holders, of which the following is a specification.

This invention relates to improvements in cord or twine holders, and has for its particular object to provide a device of this character which is simple, cheap, and effective in operation.

Another object is to provide a cord or twine holder which is so constructed that the cord will be automatically fed from the ball, and the end of said twine or cord left free for the next time of using.

A still further object is to provide a cord or twine holder having a simple clutch device for holding the end of the cord while a sliding weight feeds a new length of the cord from the ball.

Other objects and advantages will be apparent from the following description, but it will be understood that changes in the specific structure shown and described may be made within the scope of the claims without departing from the spirit of the invention.

In the drawings forming a part of this specification, Figure 1 is a front elevation of the cord holder, in operative position, Fig. 2 is a similar view with the sliding weight in its elevated position, Fig. 3 is a side elevation of the cord holder, as represented in Fig. 1, Fig. 4 is a side elevation of the device as represented in Fig. 2, Fig. 5 is an enlarged detail view, in side elevation of the clutch device, Fig. 6 is a bottom plan view of the clutch device, as represented in Fig. 5, Fig. 7 is a perspective view of the clutch detached.

Referring more particularly to the drawing, in which is shown a cord or twine holder made in accordance with the preferred form of my invention, the numeral 10 designates yoke member, having the vertically depending arms 11, to the lower ends of which is secured a transversely arranged ball supporting bar 12. Centrally of the cross piece of the yoke 10, is formed a loop 13, by means of which the device may be suspended from the ceiling of a store, or wherever the device is to be used. A cop spindle 14 is secured on the upper face, and in the center of the cross bar 12, and is adapted to hold thereon, a ball or cone of cord or twine. Depending from the bar 12, and secured thereto at the upper ends of its legs 15 is an elongated U-shaped member 16, which has a vertically moving weight 17 slidably mounted between its legs. A block 18, in which is formed two openings 19, to receive the legs of the U-shaped member 16, is mounted on the said U-shaped member, and is vertically adjustable thereon by means of the set screw 20, so that the distance of drop of the sliding weight may be regulated, and govern the amount of cord which is to be fed from the ball. The weight 17 is a block of heavy material, such as iron, or other suitable material, and has on either side thereof, the bifurcation 21, adapted to straddle the legs of the U-shaped member 16, and move up and down thereon. The cord from the ball A, on the cop spindle 14, is passed vertically downwardly and through an eye member 22 on the upper face of the weight, and thence upward toward one end of the bar 12, where it passes through a clutch device, which will be described.

The clutch device comprises a single piece of wire B, having the transverse portion 23 by means of which the device is journaled on one end of the bar 12. A plate 24 is secured at one end to the under face of the bar 12 and has its other end bent to form a loop 25, which embraces the transverse portion 23 before mentioned. Extending horizontally, in opposite directions, and from either end of the portion 23 are the extensions 26 and 27, the extension 26 of which extends transversely and parallel with the portion 23, at its free end at 28, and has its extremity bent in a vertical plane. The extension 27, at its outer end turns vertically at 29, and then transversely at 30, and lies in a plane parallel to and above the portion 23. The portion 30 extends transversely and adjacent the end face of the bar 12, and in the rocking movement on the portion 23, the said portion 30 will engage with the said face of the bar and impinge on the cord or twine passing therebetween. The cord C after passing through the eye member 22 is engaged over the portion 28 of the clutch device, under the plate 24 and through a guide eye 31 on the end of the bar 12, whence it is drawn through a loop 32 formed in one of the legs of the yoke 10 and has its end depending to a suitable point within reach of the user. It will thus be seen that when the free end C' of the cord is pulled downwardly the weight exerts a tension on the cord and pulls downwardly and causes the member B to rock against the portion of the cord which lies against the end face of the bar 12 thus holding the cord in that position. Of course it will be understood that the weight is drawn upward a short distance, but when the end C' of the cord is released the clutch device will hold the same but allows the weight to drop to its lowermost position and by means of the cord slipping through the eye member 22, will pull a new length of cord from the ball. The clutch device insures against the end of the cord passing out of reach, as the user would break off the end of the cord near the counter and leave a sufficient length to be grasped when next needed. Thus when the cord is pulled it will slide easily through the clutch device, pulling the weight up and when same is released the weight will drop to the bottom, causing the clutch device to hold the adjacent portion of the cord, and pulling a new length from the ball. By means of the adjustable block 18 and the set screw 20 the weight has the length of its downward travel regulated, as it is only necessary to slide the block to the proper position and secure the same by means of the set screw.

From the foregoing it will readily be seen that I have provided a simple and cheap cord holder in which the cord is positively held from slipping back, and in which the means for accomplishing this result are controlled by a sliding weight which also draws the supply of cord from the ball held on the holder.

What is claimed is:

1. The combination with a cord holder comprising a ball supporting means, a suspending means secured thereto and a guiding means suspended therebelow, of a clutch device consisting of a single piece of wire pivotally mounted near one end of the ball supporting means, a laterally disposed cord engaged arm formed integrally therewith and arranged beneath the cord supporting means, a lateral arm on the opposite end of the clutch device and formed integrally therewith, said second named arm adapted to engage the end face of the ball supporting means, a vertically slidable weight mounted in said guiding means, a cord passing through a guiding eye on the weight, over the cord engaged arm and between the end of the ball supporting means and the second named arm and through a guiding eye formed in the suspending means, and a vertically adjustable block on the guiding means and below the weight, for limiting the downward movement of said weight.

2. The combination with a cord holder comprising a ball supporting bar, a suspending means for the bar, a sliding weight, a guiding means for the weight depending below the said bar, and a cord passing from the said bar through said weight and upward past the ball supporting bar, of a tension device pivotally mounted near one end of said bar, said tension device comprising a single piece of wire having oppositely projecting lateral arms lying in superposed parallel planes, one of said arms being adapted to support a portion of said cord and the other of said arms being adapted to engage a portion of said cord against the end face of said bar, whereby a downward movement of said weight will pull on the first mentioned arm and cause the rocking of the tension device to bring the second mentioned arm into engagement with the cord.

In testimony whereof I affix my signature, in the presence of two witnesses.

WILLIAM W. CARDER.

Witnesses:
JOHN W. TWIGG,
NETTIE V. CARDER.

---

Copies of this patent may be obtained for five cents each, by addressing the "Commissioner of Patents, Washington, D. C."